(12) United States Patent
Lennox

(10) Patent No.: US 7,458,679 B2
(45) Date of Patent: Dec. 2, 2008

(54) SPRING-BRIDGE FOR EYEWEAR

(75) Inventor: D. Michael Lennox, North Attleboro, MA (US)

(73) Assignee: The Hilsinger Company, Plainville, MA (US)

( * ) Notice: Subject to any disclaimer, the term of this patent is extended or adjusted under 35 U.S.C. 154(b) by 239 days.

(21) Appl. No.: 11/382,943

(22) Filed: May 12, 2006

(65) Prior Publication Data

US 2007/0091252 A1   Apr. 26, 2007

Related U.S. Application Data

(60) Provisional application No. 60/727,147, filed on Oct. 14, 2005.

(51) Int. Cl.
*G02C 9/00* (2006.01)
(52) U.S. Cl. .............. 351/47; 351/58; 351/57; 351/48
(58) Field of Classification Search ............ 351/47, 351/48, 57, 58
See application file for complete search history.

(56) References Cited

U.S. PATENT DOCUMENTS

| 533,987 | A | | 2/1895 | Franc, Jr. | |
|---|---|---|---|---|---|
| 1,558,715 | A | | 10/1925 | Strauss | |
| 1,586,110 | A | | 5/1926 | Newhouse | |
| 1,909,796 | A | | 5/1933 | Anderson | |
| 2,159,710 | A | | 5/1939 | Reichert | 88/41 |
| 5,073,020 | A | * | 12/1991 | Lindberg et al. | 351/106 |
| 5,920,369 | A | * | 7/1999 | Kroman | 351/47 |
| 6,244,704 | B1 | | 6/2001 | Xiao | 351/47 |
| 6,371,612 | B1 | | 4/2002 | Barrows | 351/48 |
| 6,371,614 | B1 | | 4/2002 | Herman | 351/126 |
| 6,557,996 | B2 | | 5/2003 | Lavie | 351/47 |
| 6,557,997 | B1 | * | 5/2003 | Sieberg | 351/47 |
| 6,685,314 | B1 | | 2/2004 | Friedman | 351/128 |
| 6,755,521 | B1 | | 6/2004 | Begg | 351/48 |
| 7,048,374 | B2 | * | 5/2006 | Ng | 351/124 |
| 7,131,726 | B2 | * | 11/2006 | Hiramoto | 351/59 |
| 2004/0130675 | A1 | | 7/2004 | Einarsson | 351/128 |
| 2005/0041199 | A1 | | 2/2005 | Kim | 351/58 |

FOREIGN PATENT DOCUMENTS

WO    WO 94/14101    6/1994

* cited by examiner

*Primary Examiner*—Hung X Dang
*Assistant Examiner*—Vipin M Patel
(74) *Attorney, Agent, or Firm*—Barlow, Josephs & Holmes, Ltd.

(57) ABSTRACT

The clip-on lens assembly has a pair of lenses connected together by a uniquely shaped, spring-biased nose bridge wire that has a profile that substantially matches the profile of the nose bridge portion of a pair of eyewear. The bridge wire is connected to either the rear or front surfaces of the lenses and doubles-back on itself before forming a bridge portion, which may include curling over from the front surface to the rear surfaces of the lens. The lenses may be tinted for use as sunshades or could be also optically enhanced for use as an auxiliary corrective lens. At the outer edges of each lens is a pair of hooks used to retain the clip-on lens assembly against a pair of eyewear.

21 Claims, 10 Drawing Sheets

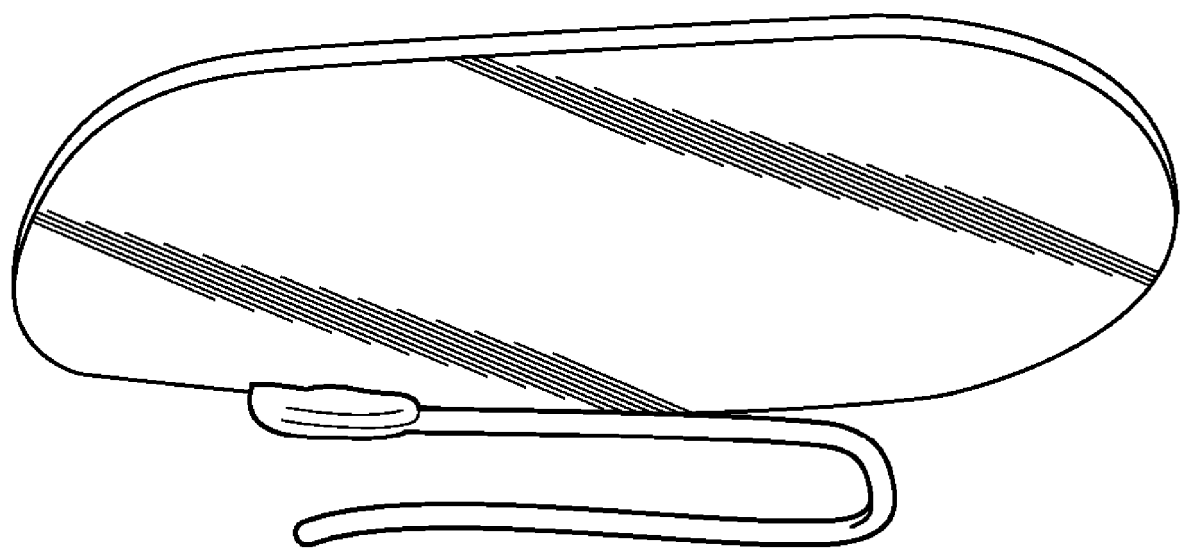

SPRING-BRIDGE FOR EYEWEAR

CROSS-REFERENCE TO RELATED APPLICATION

This application claims priority to earlier filed U.S. Provisional Application Ser. No. 60/727,147, filed Oct. 14, 2005, the contents of which are incorporated herein by reference.

BACKGROUND OF THE INVENTION

1. Field of the Invention

The present invention relates generally to clip-on lens assemblies for eyewear and more particularly, to clip-on sunglasses for use with any type of eyewear, including rimless and rimmed eyewear.

2. Background of the Related Art

Auxiliary lenses for eyewear are well-known in the art. They come in a variety of configurations to attach to various styles of eyewear for a variety of purposes. Some are merely sunshades while others include corrective or supplementary optics. All of these lens assemblies, though, include some means or structure to hold the assembly to the eyewear. The most common implementation of these assemblies includes hooks that are typically located on the outer edges of the lens assembly and are hooked on the outer edges of the eyewear frame. A spring biasing mechanism draws the lenses together, and thereby draws the hooks against the outer edges of the eyewear frame, to retain the assembly onto the eyewear.

These older spring-biasing mechanisms are, relatively speaking, typically bulky. The bulkiness of the spring-bias mechanism does not present a problem for the average pair of eyewear that has a wire or plastic frame because the spring-bias mechanism will visually blend with the frame. These frames also frequently have brow bars extending across the top of the lenses and frame, which provide another point at which the spring-bias mechanism can be hidden to make the visual appearance of the clip-on lens assembly mounted on the eyewear more aesthetically pleasing.

The advent of rimless eyewear presents a different situation, however. Referring to FIG. 1, a typical pair of ordinary rimless eyewear is shown generally at 10. Rimless eyewear 10, as its name implies, lacks a frame. Instead, the lenses 12 are held together by a thin wire or plastic nose bridge portion 14 that is often riveted 16 to the lenses 18 themselves. The temple bars 20 are also attached directly to the outer edges of the lenses 16 in a similar manner as the nose bridge portion 14 is attached. Because the rimless eyewear 10 lacks a frame and often has a thin nose bridge portion 14, the clip-on lens assemblies of the prior art suffer from the disadvantage of not being able to present an aesthetic appearance while mounted on the eyewear 10.

In the eyewear industry, style and appearance are highly desirable traits for eyewear and are often the driving factor in a successful product. Therefore, there is a need for a clip-on lens assembly that, while mounted on a pair of eyewear, presents a more aesthetic appearance by minimizing or blending the visual appearance of the structures used to retain the clip-op lens assembly to the eyewear while still securely attaching the clip-on to the eyewear.

SUMMARY OF THE INVENTION

The present invention solves the problems of the prior art by providing a clip-on lens assembly that has a uniquely shaped, spring-biased nose bridge wire that has a profile that substantially matches the profile of the nose bridge portion of a pair of eyewear. In particular, the clip-on glasses include a right lens and a left lens, each lens having first surface, a second surface, an inside edge and an outside edge, respectively. A bridge wire connects the right lens to the left lens at a left mounting point and a right mounting point on the left lens and right lens respectively. The bridge wire depends from the left mounting point and right mounting point and doubles-back on it self prior to forming a bridge between the right lens and the left lens. The bridge wire spring-biases the right lens and left lens inwardly towards each other. The clip-on lens assembly of the present invention includes a pair of lenses. The lenses may be tinted for use as sunshades or could be also optically enhanced for use as an auxiliary corrective lens. At the outer edges of each lens is a pair of hooks used to retain the clip-on lens assembly against a pair of eyewear.

Accordingly, among the objects of the present invention is the provision for a clip-on sunglasses assembly that mounts to a pair of rimless eyewear.

Another object of the present invention is the provision for a clip-on sunglasses assembly that has a bridge wire with a profile that is substantially similar to the profile of the bridge wire of the rimless eyewear to present a more aesthetic appearance.

Another object of the present invention is the provision for a clip-on sunglasses assembly that has a bridge-wire that uniquely doubles-back on itself to spring-bias the bridge wire.

BRIEF DESCRIPTION OF THE DRAWINGS

These and other features, aspects, and advantages of the present invention will become better understood with reference to the following description, appended claims, and accompanying drawings where:

FIG. 10 is a left side view of the alternative embodiment of the clip-on sunglasses of the present invention, it being understood that the right side view is the mirror image thereof.

DETAILED DESCRIPTION OF THE PREFERRED EMBODIMENT

Figure 7:
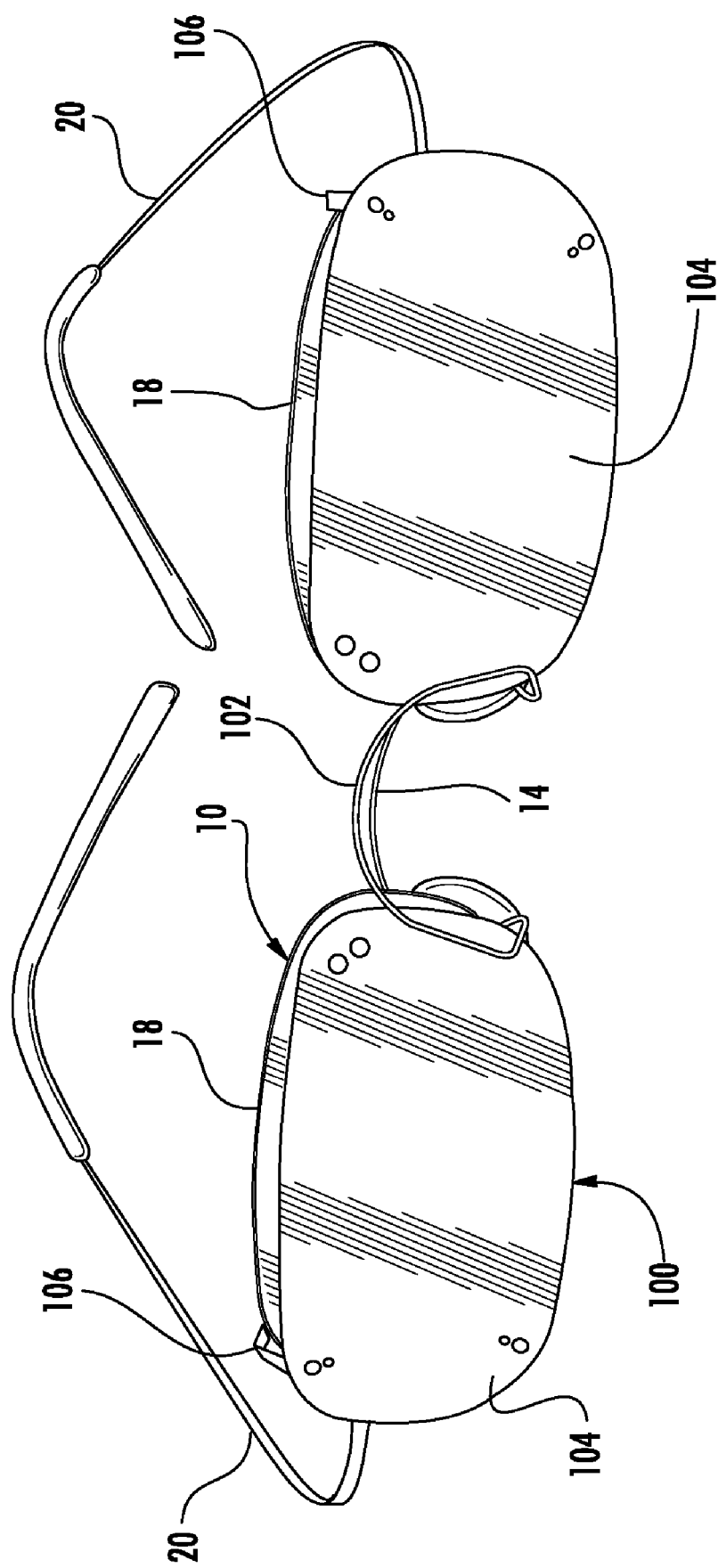
FIG. 7 is a front view of the preferred embodiment attached to a pair of rimless eyewear.

Referring the FIG. 7, the clip-on lens assembly 100 of the present invention has a uniquely shaped, spring-biased nose bridge wire 102 that substantially blends with the nose bridge portion 14 of the eyewear 10 when attached thereto. The profile of the bridge wire 102 has a profile that substantially matches the profile of the nose bridge portion 104 of the eyewear onto which the clip-on lens assembly 100 is attached.

Referring back to FIG. 2, the clip-on lens assembly 100 of the present invention includes a pair of lenses 104. The lenses 104 may be tinted for use as sunshades or could be also optically enhanced for use as an auxiliary corrective lens. At the outer edges of each lens is a pair of hooks 106 use to retain the clip-on lens 100 assembly against a pair of eyewear 10.

Figure 1:
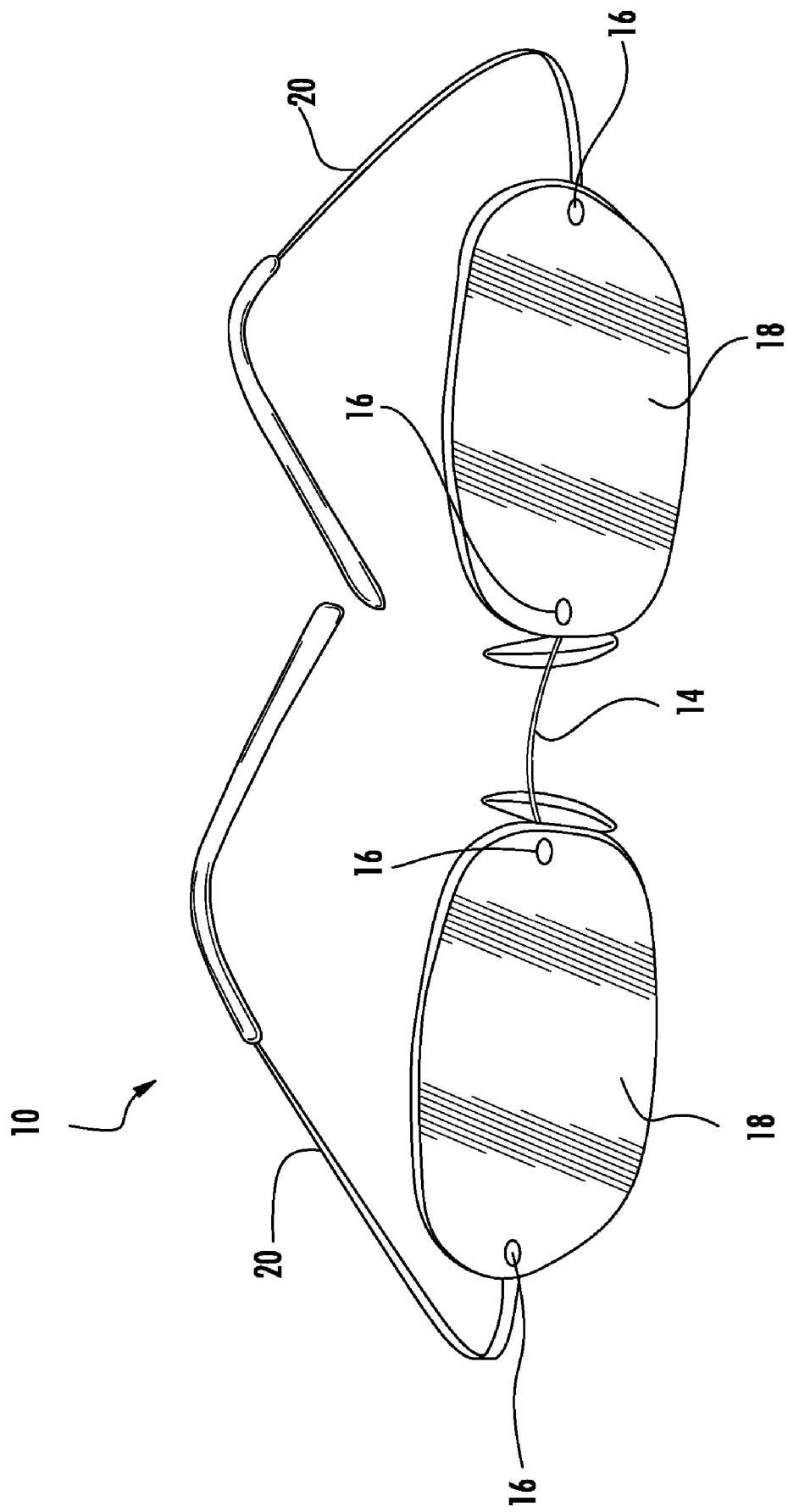
FIG. 1 is a perspective view of a prior art pair of rimless eyewear.
Figure 2:
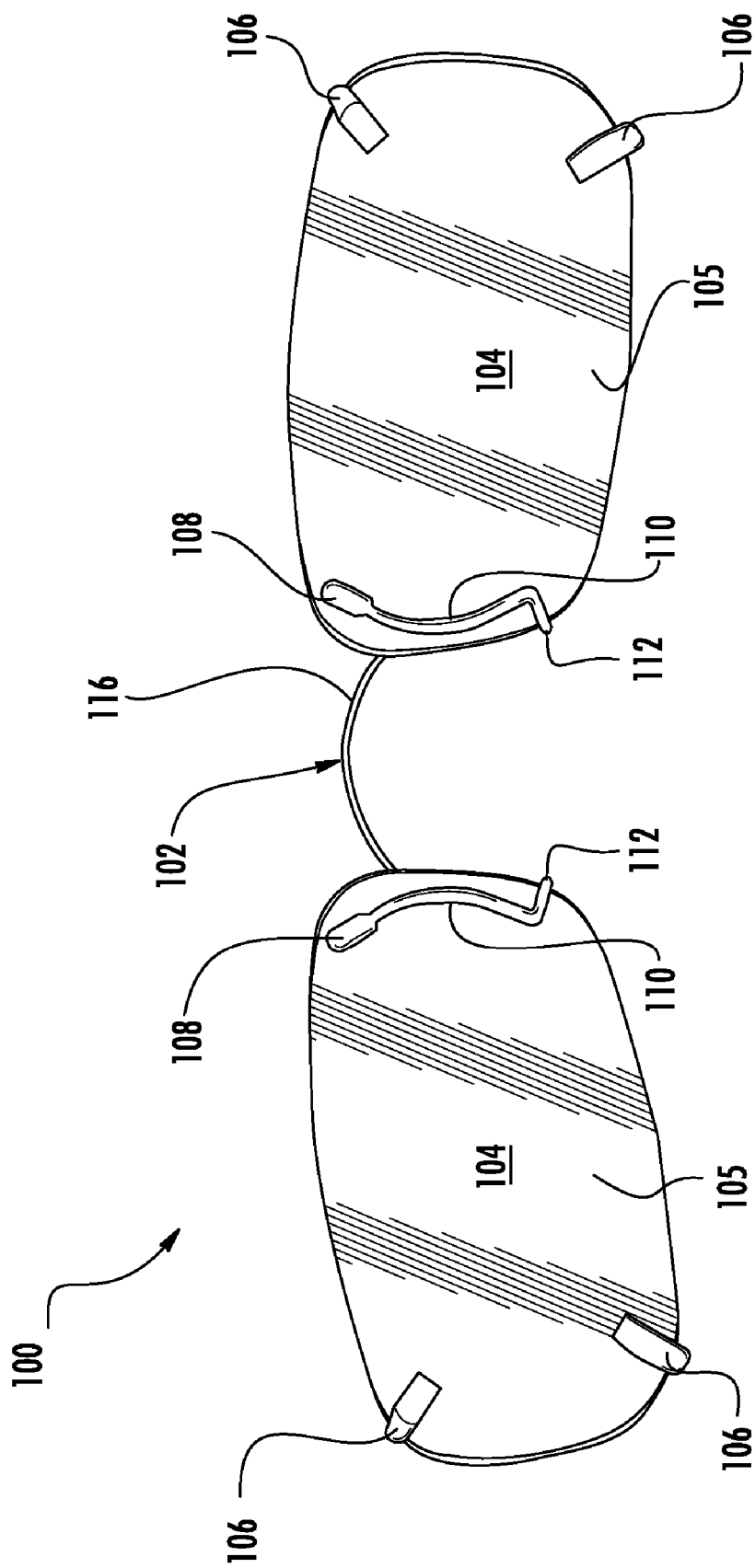
FIG. 2 is a rear view of the preferred embodiment of the clip-on sunglasses of the present invention.

A bridge wire 102 connects the two lenses 104 together and is attached at two mounting points 108 on the rear surfaces 105 of the lenses 104, which are best illustrated in FIG. 2. Mounting the bridge wire 102 to the rear surfaces 105 of the lenses 104 also has the added advantage of hiding the mounting points 108 from observers, thereby presenting a more aesthetic appearance. However, the mounting points 108 may also be mounted to the front surfaces 107 of the lenses 104 also if desired. The mounting points 108 are preferably secured to the lenses 104 with rivets, but other attachment means well-known in the art may also be used, such as screws with mating nuts.

Figure 3:
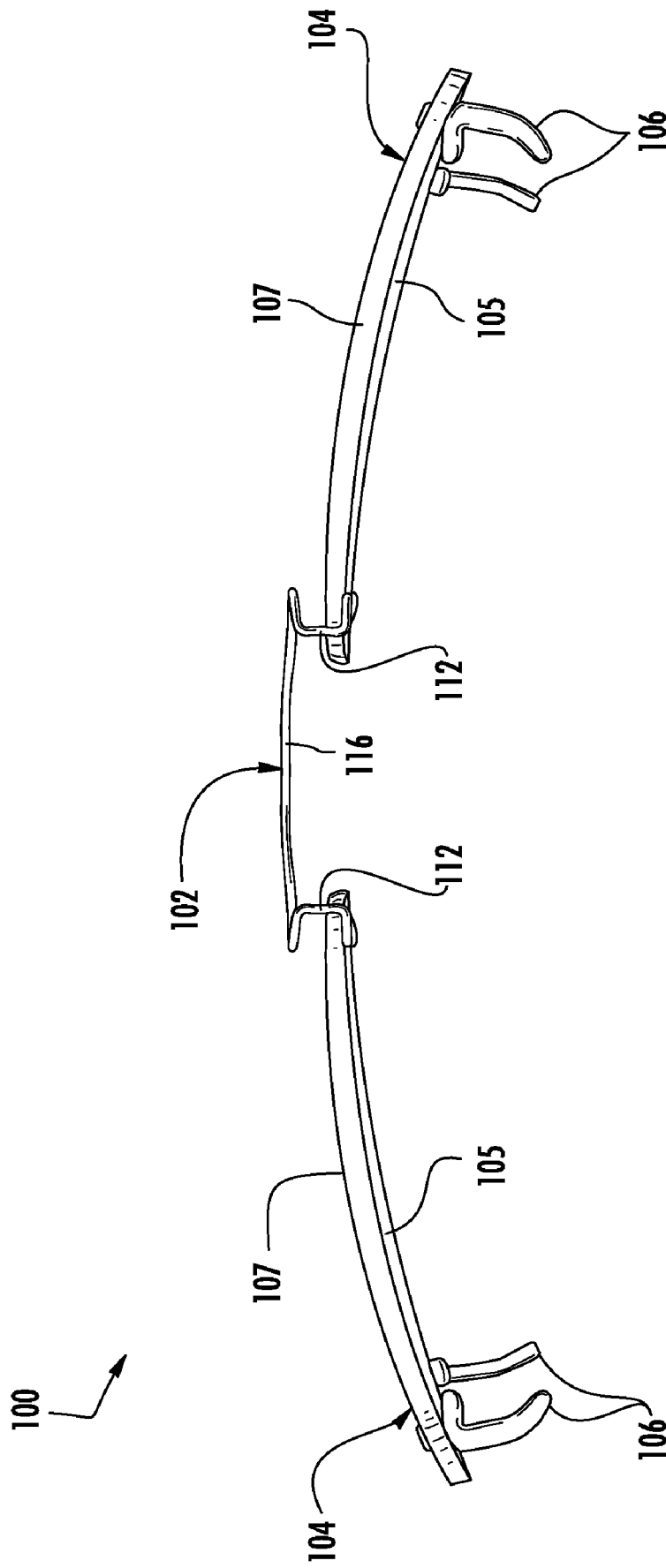
FIG. 3 is a bottom view of the preferred embodiment of the clip-on sunglasses of the present invention.
Figure 4:
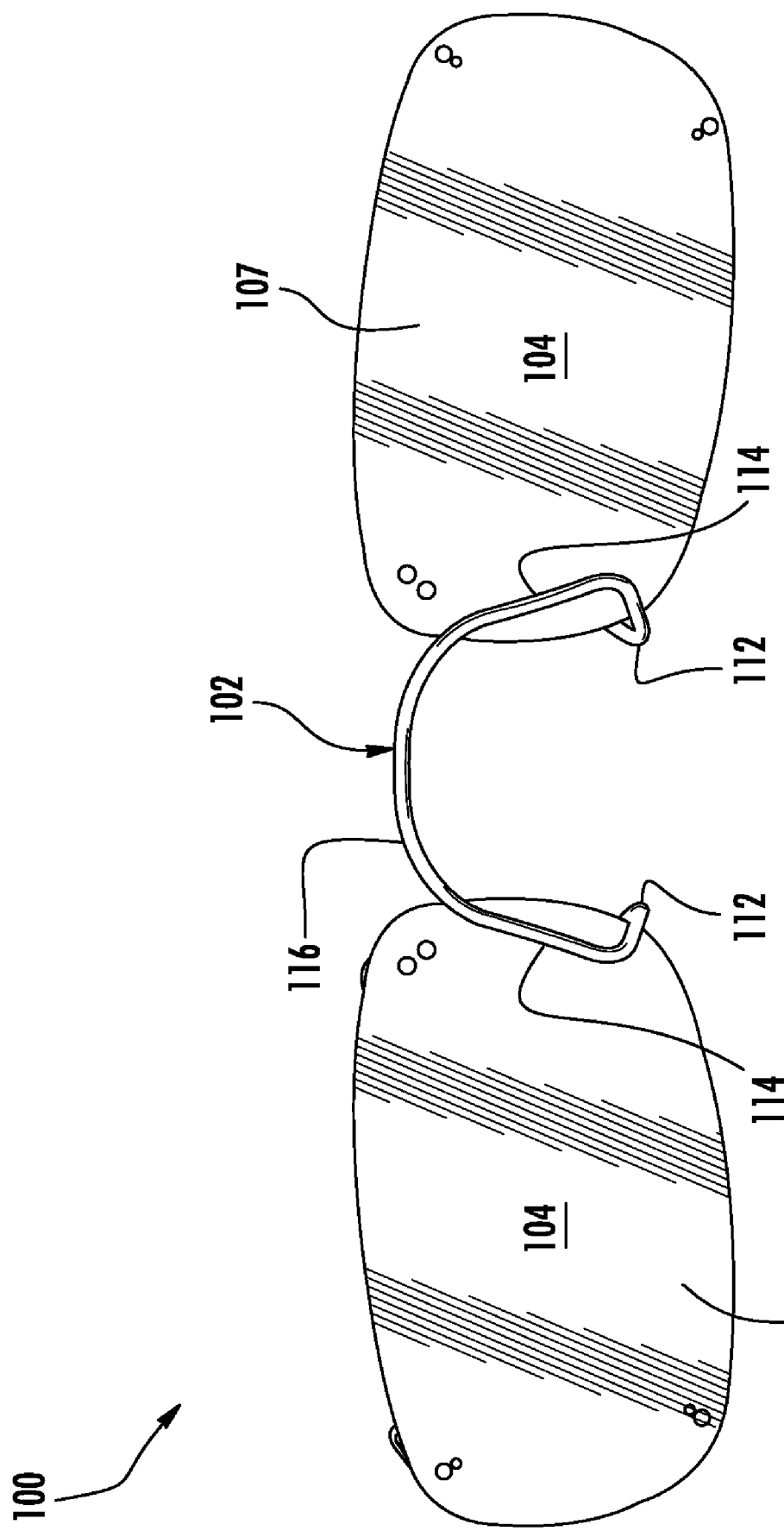
FIG. 4 is a front view of the preferred embodiment of the clip-on sunglasses of the present invention.
Figure 5:
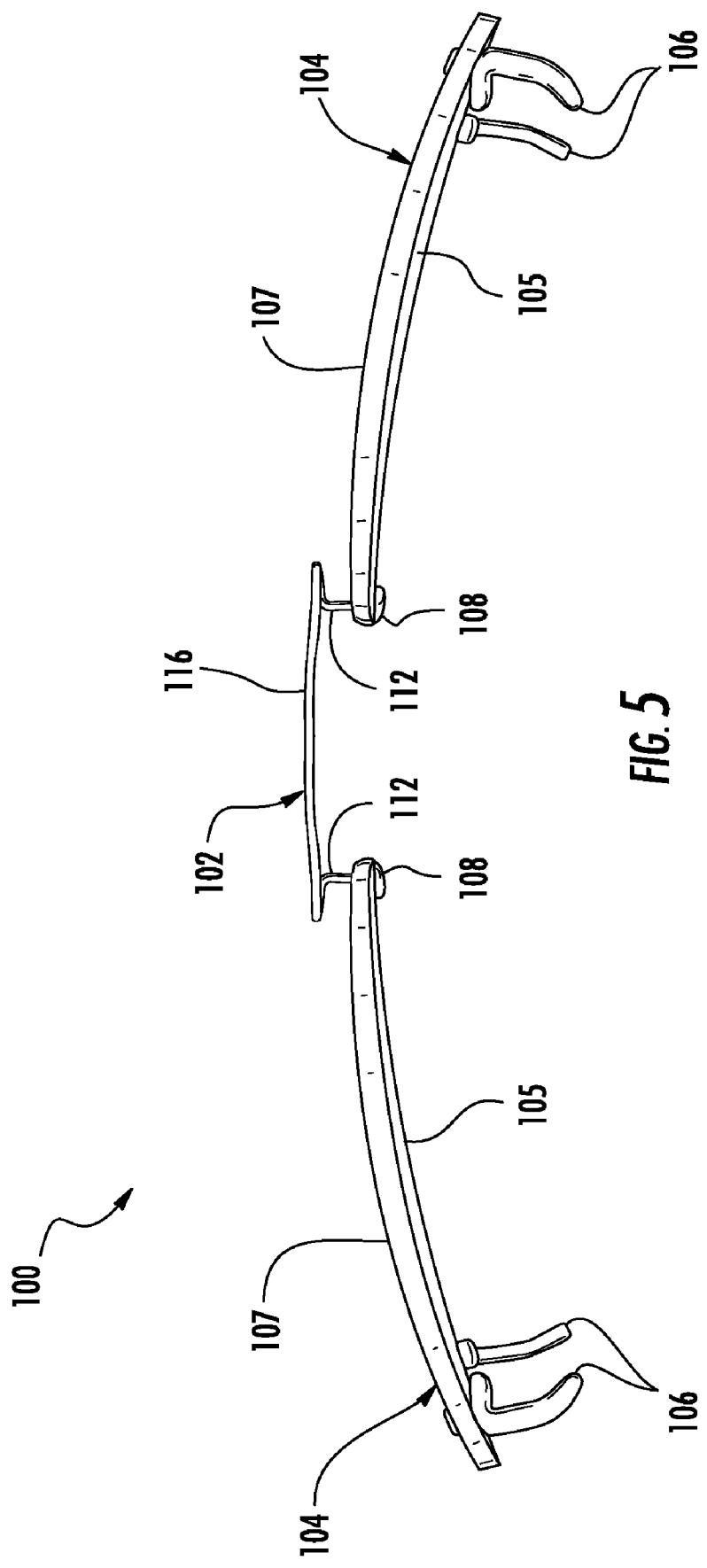
FIG. 5 is a top view of the preferred embodiment of the clip-on sunglasses of the present invention.
Figure 8:
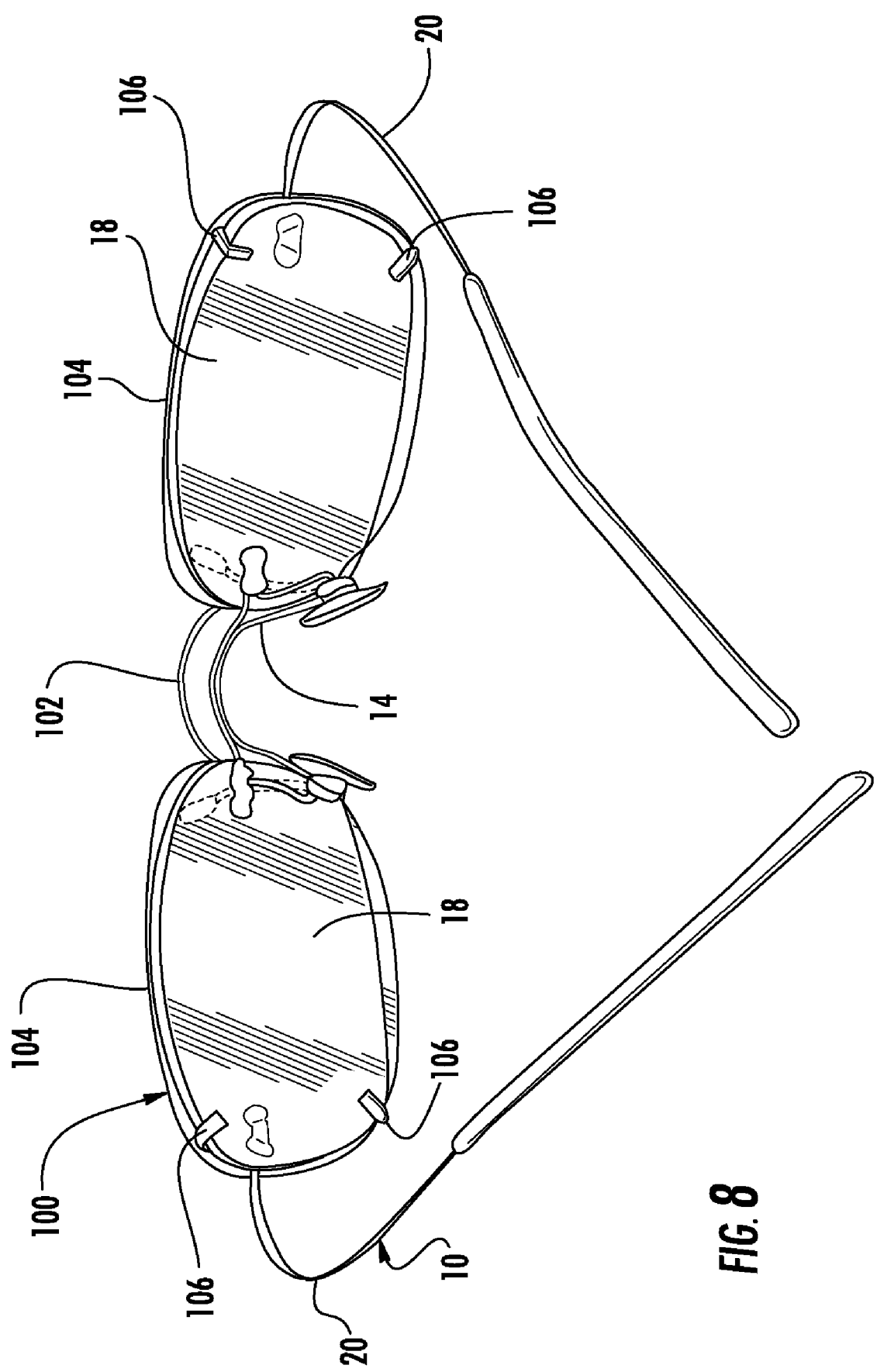
FIG. 8 is a rear view of the preferred embodiment attached to a pair of rimless eyewear.

The bridge wire 102 follows a circuitous route downward the lenses 104 from the mounting points 108 and close to the inside edges of the lenses 104 forming a rear leg portion 110. The bridge wire then curls over to the front surfaces 107 of the lenses 104 (as seen in FIG. 3) forming an inside leg portion 112. The bridge wire 102 then travels upwards along the inside edges of the front surface 107 the lenses 104 to form a front leg portion 114. The bridge wire then travels across to form an arch-shaped bridge portion 116 (as seen in FIGS. 4 and 5). The bridge portion 116 formed by the bridge wire 102 is preferably located at a point where the profile of the bridge wire 102 substantially matches the profile of the nose bridge portion 14 of a pair of eyewear 10 when the clip-on lens assembly 100 is mounted to the eyewear 10 (as shown in FIGS. 7-8). This uniquely shaped bridge wire 102 spring-biases the lenses 104 inwardly toward one another. Forming the bridge wire 102 on the front surfaces 107 of the lenses 104 also has the added advantage of allowing the bridge wire 102 to be mounted more closely to the eyewear 10 and because the bridge wire 102 and nose bridge portion 14 of the eyewear 10 will not interfere with one another.

Figure 6:
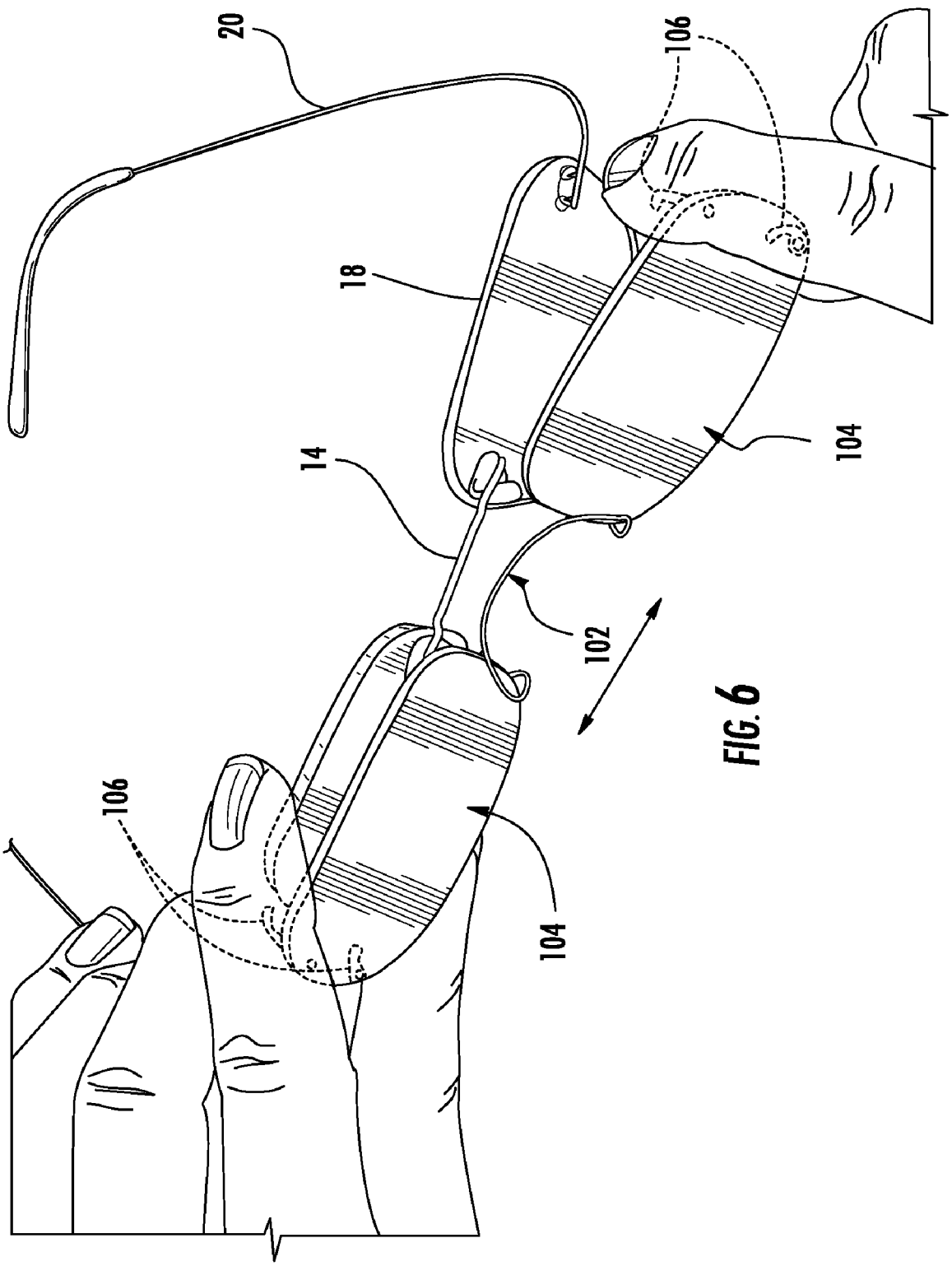
FIG. 6 is a perspective view of preferred embodiment of the present invention being attached to a pair of rimless eyewear.

The user can mount the clip-on lens assembly 100 to a pair of rimless eyewear 10 by laterally stretching apart the clip-on lens assembly 100 at the outer edges of the lenses 104 with enough force to overcome the spring-bias forces of the bridge wire 102. As shown in FIG. 6, the user can attach the clip-on lens assembly 100 to the eyewear 10 with one hand by hooking one end of the clip-on assembly 100 by the hooks 106 to one lens 18 of the pair of eyewear 10 and then laterally stretching the entire assembly 100 over the forward face of the eyewear 10 a sufficient distance to hook the opposing end of the clip-on lens assembly 100 to the opposite lens 18 of the pair of eyewear 10. The user then adjusts the clip-on assembly 100 over the front surface of the pair of eyewear 10 and releases the clip-on lens assembly 100. The spring-bias forces of the bridge wire 102 draw the lenses 104 of the clip-on lens assembly 100 inwardly toward one another to retain the clip-on lens assembly 100 to the pair of eyewear 10 by the hooks 106 as shown in FIGS. 7 and 8.

Figure 9:
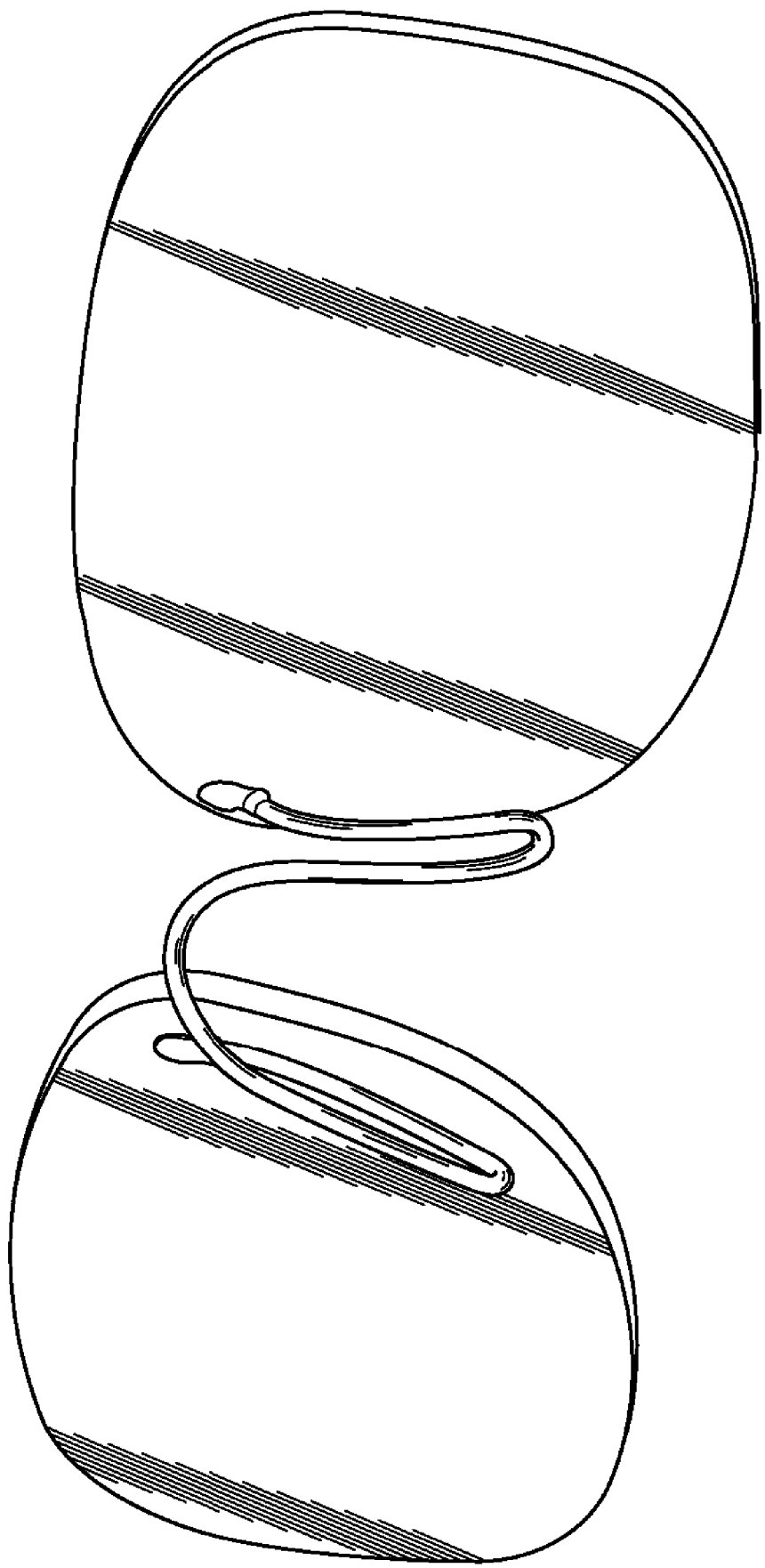
FIG. 9 is a perspective view of an alternative embodiment of the clip-on sunglasses of the present invention.

An alternative embodiment 200 of the clip-on sunglasses of the present invention, as shown FIG. 9, has a bridge wire 202 that uniquely double-backs on itself, yet remains on the front surface 205 of the lenses 204, as seen in FIG. 10. In particular, the bridge wire 202 is secured to the left and right lenses 204 at mounting points 208 by a pair rivets (although other attachment means may be used). Hooks 206 are located at the outside edges of the lens 204 to secure the clip-on 200 to a pair of eyewear 10. The bridge wire 202 depends downwardly, following closely to the inside edges of the lens 204 forming a rear leg portion 214. The bridge wire 202 curls upwardly forming a bend portion 212 which causes the bridge wire 202 to nearly double-back on itself. The bridge wire then extends upwardly forming a front leg portion 214 before forming a substantially arch-shaped bridge portion 216.

Therefore, it can be seen that the present invention provides a clip-on lens assembly with a unique spring bridge construction for a pair of eyewear that presents an aesthetic and stylish appearance that is desirable to consumers while providing a clip-on lens assembly that is easy to install and remove while capable of securely remaining installed on the eyewear.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. Clip-on glasses for a pair of eyewear, comprising:
   a right lens and a left lens, each lens having first surface, a second surface, an inside edge and an outside edge, respectively;
   a bridge wire connecting the right lens to the left lens;
   said bridge wire having a left mounting point and a right mounting point connected to the first surfaces of the left lens and right lens respectively;
   said bridge wire depending from the left mounting point and right mounting point and doubling-back on itself prior to forming a bridge between the right lens and the left lens;
   said bridge wire spring-biasing the right lens and left lens inwardly towards each other; and
   means for retaining the clip-on glasses to the pair of eyewear.

2. The clip-on of claim 1, wherein the first surfaces of the left lens and the right lens are rearward facing; and the second surfaces of the left lens and the right lens are forward facing.

3. The clip-on of claim 2, wherein the means for retaining the clip-on glasses to the pair of eyewear comprises,
   a first pair of hooks located on the first surface and near the outside edge of the right lens and projecting rearward thereof; and
   a second pair of hooks located on the first surface and near the outside edge of the left lens and projecting rearward thereof.

4. The clip-on of claim 1, wherein the first surfaces of the left lens and the right lens are forward facing; and the second surfaces of the left lens and the right lens are rearward facing.

5. The clip-on of claim 4, wherein the means for retaining the clip-on glasses to the pair of eyewear comprises,
   a first pair of hooks located on the second surface and near the outside edge of the right lens and projecting rearward thereof; and
   a second pair of hooks located on the second surface and near the outside edge of the left lens and projecting rearward thereof.

6. The clip-on of claim 1, wherein the bridge wire doubles-back over the inside edge of the left lens and the inside edge of the right lens, respectively.

7. Clip-on glasses for a pair of eyewear, comprising:
   a right lens and a left lens, each lens having first surface, a second surface, an inside edge and an outside edge, respectively;
   a bridge wire connecting the right lens to the left lens;
   said bridge wire mounted at right and left mounting points on the first surfaces of the right lens and left lens, respectively, curling over the inside edges of the right lens and left lens, respectively, to the second surfaces of the right lens and left lens, and forming a bridge between the right lens and the left lens;

said bridge wire spring-biasing the right lens and left lens inwardly towards each other; and means for retaining the clip-on glasses to the pair of eyewear.

8. The clip-on of claim 7, wherein the first surfaces of the left lens and the right lens are rearward facing; and the second surfaces of the left lens and the right lens are forward facing.

9. The clip-on of claim 8, wherein the means for retaining the clip-on glasses to the pair of eyewear comprises, a first pair of hooks located on the first surface and near the outside edge of the right lens and projecting rearward thereof; and a second pair of hooks located on the first surface and near the outside edge of the left lens and projecting rearward thereof.

10. The clip-on of claim 7, wherein the bridge wire travels downwardly from the left and right mounting points, respectively, and proximate to the inside edges of the right lens and left lens, respectively, prior to curling over the inside edges to the second surfaces thereof.

11. The clip-on of claim 10, wherein the bridge wire travels upwardly and proximate to the inside edges of the right lens and left lens, respectively, after curling over to the second surfaces thereof but prior to forming the bridge.

12. The clip-on of claim 7, wherein the bridge formed by the bridge wire is substantially arch-shaped.

13. The clip-on of claim 7, wherein the bridge formed by the bridge wire has a profile that is complimentary to the profile of a bridge portion of the pair of eyewear.

14. The clip-on of claim 7, wherein the right and left mounting points are rivets.

15. Clip-on glasses for a pair of eyewear, comprising:

a right lens and a left lens, each lens having front and rear surfaces and inside and outside edges, respectively;

a bridge wire connecting the right lens to the left lens;

said bridge wire mounted at right and left mounting points on the rear surfaces of the right lens and the left lens, respectively, curling over the inside edges of the right lens and the left lens, respectively, to the front surfaces of the right lens and the left lens, and forming a bridge between the right lens and the left lens;

said bridge wire spring-biasing the right lens and the left lens inwardly towards each other; and means for retaining the clip-on glasses to the pair of eyewear.

16. The clip-on of claim 15, wherein the bridge formed by the bridge wire is substantially arch-shaped.

17. The clip-on of claim 15, wherein the bridge formed by the bridge wire has a profile that is complimentary to the profile of a bridge portion of the pair of eyewear.

18. The clip-on of claim 15, wherein the means for retaining the clip-on glasses to the pair of eyewear comprises, a first pair of hooks located on the rear surface and near the outside edge of the right lens and projecting rearward thereof; and a second pair of hooks located on the rear surface and near the outside edge of the left lens and projecting rearward thereof.

19. The clip-on of claim 15, wherein the bridge wire travels downwardly from the left and right mounting points, respectively, and proximate to the inside edges of the right lens and left lens, respectively, prior to curling over the inside edges to the front surfaces thereof.

20. The clip-on of claim 19, wherein the bridge wire travels upwardly and proximate to the inside edges of the right and left lenses, respectively, after curling over to the front surfaces thereof but prior to forming the bridge.

21. The clip-on of claim 15, wherein the right and left mounting points are rivets.

* * * * *